United States Patent [19]

Sohl et al.

[11] Patent Number: 4,509,057

[45] Date of Patent: Apr. 2, 1985

[54] AUTOMATIC CALIBRATION OF DROP-ON-DEMAND INK JET EJECTOR

[75] Inventors: Gordon Sohl, Richardson; Donald L. Ort, Dallas; John R. Leicht, Bedford, all of Tex.

[73] Assignee: Xerox Corporation, Stamford, Conn.

[21] Appl. No.: 468,834

[22] Filed: Mar. 28, 1983

[51] Int. Cl.[3] .............................................. G01D 18/00

[52] U.S. Cl. .................................. 346/1.1; 346/140 R

[58] Field of Search ............................ 346/140, 75, 1.1

[56] References Cited

U.S. PATENT DOCUMENTS

| | | | |
|---|---|---|---|
| 3,886,564 | 5/1975 | Naylor | 346/75 |
| 3,907,429 | 9/1975 | Kuhn | 346/75 X |
| 3,911,445 | 10/1975 | Foster | 346/75 X |
| 3,911,818 | 10/1975 | MacIlvaine | 346/75 X |
| 4,045,770 | 8/1977 | Arnold | 346/75 |
| 4,136,345 | 1/1979 | Neville | 346/75 |
| 4,138,688 | 2/1979 | Heard | 346/75 |
| 4,150,384 | 4/1979 | Meece | 346/75 |
| 4,158,204 | 6/1979 | Kuhn | 346/75 |
| 4,217,594 | 8/1980 | Meece | 346/75 |
| 4,255,754 | 3/1981 | Crean | 346/75 |
| 4,323,905 | 4/1982 | Reitberger | 346/75 |
| 4,323,908 | 4/1982 | Lee | 346/140 |

OTHER PUBLICATIONS

Fan, G. J.; Phase Detection of the Ink Jet Droplets; IBM TDB, vol. 16, No. 3, Aug. 1973, p. 880.

*Primary Examiner*—Joseph W. Hartary
*Attorney, Agent, or Firm*—Richard A. Tomlin

[57] ABSTRACT

A method of calibrating a scanning carriage drop-on-demand ink jet ejector wherein the ejector is traversed past a droplet detection light beam while droplets are ejected. By knowing the position of the ejector and relating it to the amount of light blocked by droplets, horizontal errors in drop position can be detected. Similarly, by measuring the amount of time elapsing between droplet ejection and droplet detection, the velocity of the droplets can be determined. Corrections can be made by adjusting the time of ejection and/or the drive pulse amplitude and/or width.

2 Claims, 5 Drawing Figures

AUTOMATIC CALIBRATION OF DROP-ON-DEMAND INK JET EJECTOR

The invention relates to the automatic calibration of drop-on-demand ink jet ejectors.

Drop-on-demand ink ejectors are well known in the art, commercial units being available. Drop-on-demand ink jet ejectors eject droplets only when a mark is required by the image to be formed. In one embodiment, ink is contained in a chamber, the chamber including inlet means to supply ink and an exit orifice through which ink droplets are expelled. The ink is held in the chamber by utilizing an exit orifice small enough for the surface tension of the ink to prevent ink from running out. One wall of the chamber is provided with a flexible membrane, which membrane is in contact with the ink. An electromechanical transducer is bonded to the free surface of the flexible membrane in such a manner that when the transducer is "fired" by an electrical drive pulse, it bends the membrane causing the membrane to pass a pressure wave into the ink sufficient to eject an ink droplet from the exit orifice.

Conventional drop-on-demand ink jet printers utilize a substantially vertical array of ejectors mounted on a carriage which is scanned one or more times horizontally along a line of printing across a stationary print-receiving surface, e.g., a sheet of paper on which it is desired to print. See, for example, U.S. Pat. No. 4,340,893, issued July 20, 1982, to Donald L. Ort, which shows a typical carriage mounted printer. In these scanning carriage ink jet printers, after a line of printing is completed, the paper is advanced stepwise to be in position for the next line of printing. Since the ejector array is being moved in relation to the print-receiving surface, when printing occurs, the timing of the droplet ejection must be controlled to provide high-quality images. If the timing is not controlled, the droplets will impact the record-receiving surface other than where desired.

The present invention provides a method for periodically calibrating the ejectors in an array of drop-on-demand ejectors. The system is capable of correcting for horizontal directional errors in droplet placement. Also, the velocity at which droplets are ejected can be determined, and corrections can be made for velocity errors.

The caribration method comprises using a droplet detection zone which is a vertical light beam in the plane of the printed surface. The array of ejectors is moved at a constant predetermined horizontal velocity past the detection zone while droplets are ejected from the ejector being calibrated. The time between ejection and interruption of the light beam provides a measure of droplet velocity. Also, by knowing the horizontal position of the array with respect to the light beam at the time of image interruption, a measure of the directional accuracy of the ejector is obtained. Drive pulse timing and/or drive pulse waveshape are corrected accordingly.

The system for calibrating drop-on-demand ink jet ejectors will be better understood upon consideration of the following disclosure, particularly when taken in conjunction with the attached drawing in which.

Figure 1:
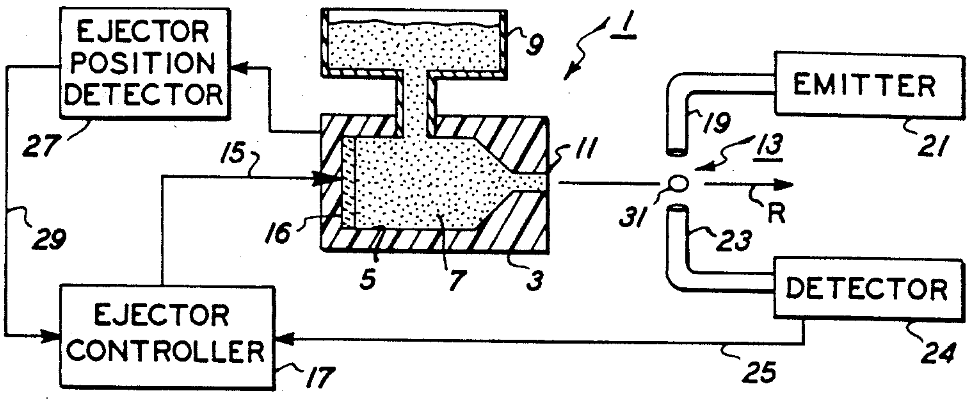
FIG. 1 is a schematic representation of an ink jet ejector and calibration system in accordance with this invention.

Referring now to FIG. 1, there is shown a drop-on-demand ink jet ejector 1 made up of ejector body 3 having ink channel 5 formed therein. Ink channel 5 is provided with ink 7 from ink reservoir 9. An exit orifice 11 is formed in ejector body 3.

An ejector controller 17 provides a drive pulse 15 of controlled frequency, pulse width and amplitude to electromechanical transducer 16. For calibration purposes, emitter-optical fiber 19, connected to optical emitter 21 and optical detector optical fiber 23, is connected to optical detector 24. A light beam (not shown) is passed from optical fiber 19 to optical fiber 23 forming a detection zone 13 between the ends of the two optical fibers 19, 23. The detection zone 13 here, by way of example, would be a vertical cylinder having a diameter approximately equal to the diameter of the optical fibers 19, 23. The detector output pulse 25 is fed to ejector controller 17. A jet position detector 27, which may be, for example, an optical linear encoder, provides ejector position information 29 to ejector controller 17.

Upon generation of a drive pulse 15 by ejector controller 17, electromechanical transducer 16, typically a piezoelectric disk, is subjected to an electrical potential difference across its thickness having a predetermined wave amplitude and width causing a droplet 31 to be expelled.

A drop-on-demand ink jet ejector 1 has a definite operating region defined by maximum and minimum energy boundaries, which produce acceptable drop formation. That is, drop formation without satellite formation or face wetting and acceptable droplet velocity. The operating point within this operating region is established by jet drive pulse amplitude and pulse width. The maximum operating region boundary is usually limited by satellite onset condition and produces a high velocity whereas the minimum boundary is limited by a minimum acceptable drop velocity, a drop velocity which provides consistently accurate droplet position. Once the drop velocity has been defined for a particular ejector for maximum and minimum boundary conditions, the drop velocity is a good measure of whether the jet is operating efficiently. It is, accordingly, desirable to periodically measure and adjust droplet velocity not only to produce high-quality images but to improve ejector efficiency. The present calibration device can automatically make the adjustments necessary for efficient ejector operation.

Figure 3:
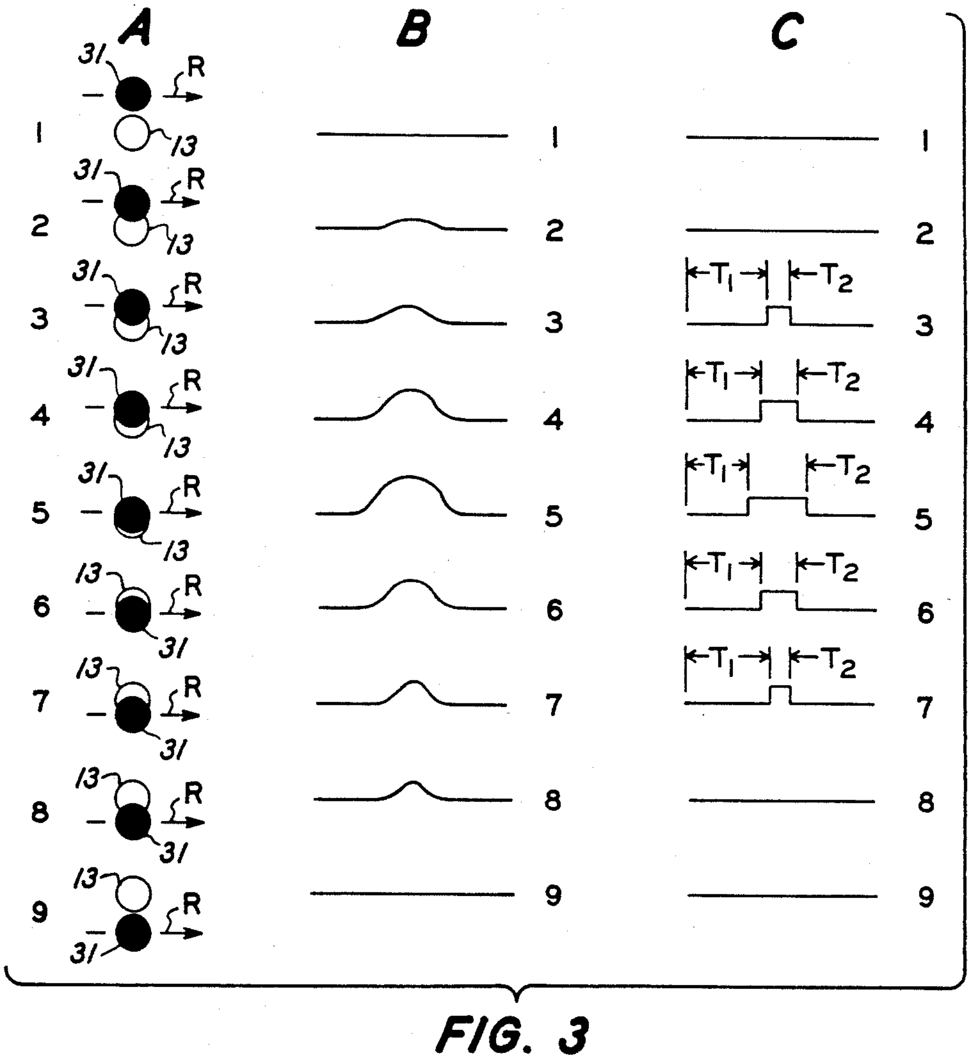
FIG. 3 is a set of analog and digital waveshapes that result from the operation of the apparatus of FIG. 1 and includes representations of the droplet detection zone interface for varying ejector positions.
Figure 2:
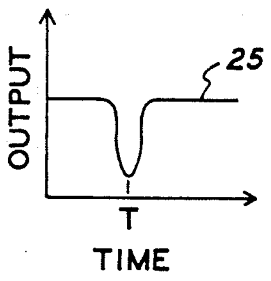
FIG. 2 is a plot of detector output versus time for the calibration system of FIG. 1.

The apparatus as shown in FIG. 1 can be used to determine the velocity of droplet 31 ejection. A light beam is transmitted from emitter-optical fiber 19 to detector optical fiber 23 forming detection zone 13. Ejector controller 17 activates electromechanical transducer 16 at time $T_o$. Droplet 31 is ejected from exit orifice 11 in direction R. When the droplet breaks the light beam in the detection zone 13, a detector output pulse 25 is generated by optical detector 24 as shown in FIG. 2. This pulse 25 is provided to ejector controller 17, which controller measures the time between drive pulse 15 activation and light beam interruption. Since the distance between the ejector 1 and detection zone 13 is known, the ejector controller 17 can calculate jet droplet velocity. During the calibration cycle, the carriage on which the ejector 1 is mounted is moved in a horizontal direction in respect to the vertical light beam. A jet position detector 27, which may be, by way of example, an optical linear encoder, supplies position information to ejector controller 17. The ejector controller 17 compares the output of jet position detector 27 with the pulse 25 received from optical detector 24. Ejector controller 17 determines horizontal directional errors in the droplet 31 path direction R as follows:

Referring now to FIG. 3, Column A represents top views of the detection zone 13 of the optical detector system with ink droplets 31 represented by the black circles, and detection zone 13 represented by the clear circles at ejector increments preset and controlled by ejector controller 17. It is assumed here that position 1 represents a position to the left of the detection zone 13 and that the ejector 14 is moved horizontally to the right past the detection zone 13. As the ejector 1 is moved from left to right, ejector controller 17 causes droplet 31 ejection at predetermined intervals represented in FIG. 3, Column A, as positions 1–9. The ink droplets 31 and detection zone 13 here are shown at the moment of maximum interruption of the detection zone 13 by the droplets 31. At position 1, the droplet misses the detector resulting in no change in output as represented by Column B, line 1. The ejector 1 is then fired again as the carriage moves through position 2. The ink droplet 31 interrupts the light beam providing the change in output shown at Column B, line 2. For purposes of explanation, it is assumed here that the droplet 31 in a properly operating ejector would pass through the center of the light beam or detection zone 13 at position 5. It is also assumed that an error in horizontal position of the droplet of Δx is present.

As ejector 1 moves at a calibration velocity $V_c$ past the detection zone 13 and droplets 31 are ejected at preset intervals, a series of analog pulses is produced represented by lines 1–9 in Column B. The smaller pulses are produced from a partial blocking of the light beam, and the larger pulses are produced from a substantial or complete blocking of the light beam. Since these signals will be processed in a digital processor, these pulses are converted by the ejector controller to digital signals of uniform height and variable width as shown in Column C, the larger analog pulses corresponding to the longer digital pulses. Times $T_1$ and $T_2$ fully characterize these digital pulses.

Figure 4:
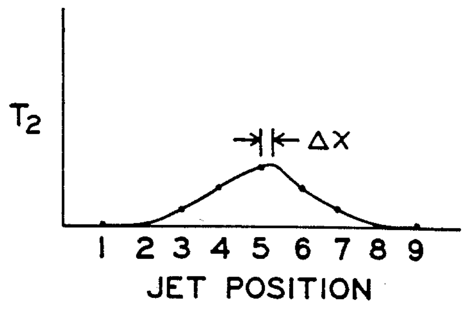
FIG. 4 is a plot of digital pulse width $T_2$ versus ejector position resulting from analysis of the digital pulse widths of FIG. 3.

FIG. 4 shows a plot of the digital pulse widths $T_2$ of FIG. 3, Column C, plotted against ejector 1 position. As the ejector 1 moves from left to right, the pulse widths $T_2$ become wider and then narrower. Using a digital program to fit the curve, the position of the drop 31 in relation to the ejector 1 is computed. Here the droplet is found from analysis of the data to be offset to the right a distance Δx from the preferred droplet 31 position. The program also computes drop velocity from the digital waveshapes of FIG. 3, Column C. The droplet velocity is equal to the distance from the ejector 1 to the detection area divided by $T_1$ plus $T_2/2$. That is:

$$V_d = D/(T_1 + T_2/2)$$

Finally, the ejector controller 17 calculates the correction necessary to correct the change in error Δx by causing the ejector 1 to expel droplets 31 sooner or later than normal operation. In the example, the droplet is off a distance Δx to the right of where it is supposed to be. Accordingly, when the ejector 1 is printing from left to right, the ejector controller 17, using the ejector position detector signal 29, causes ejector 1 to eject droplets at a position to the left of or before it would normally eject. Similarly, if the ejector 1 is printing on the return, that is, from right to left, the ejector controller 17 would cause the ejector 1 to eject droplets again further to the left but timewise after it would normally cause droplets to be ejected.

Where an array of ejectors is utilized, the calibration cycle would be repeated for each ejector. If each ejector in the array of jets is offset horizontally from each other, then it would be possible to calibrate all jets in a single pass.

Figure 5:
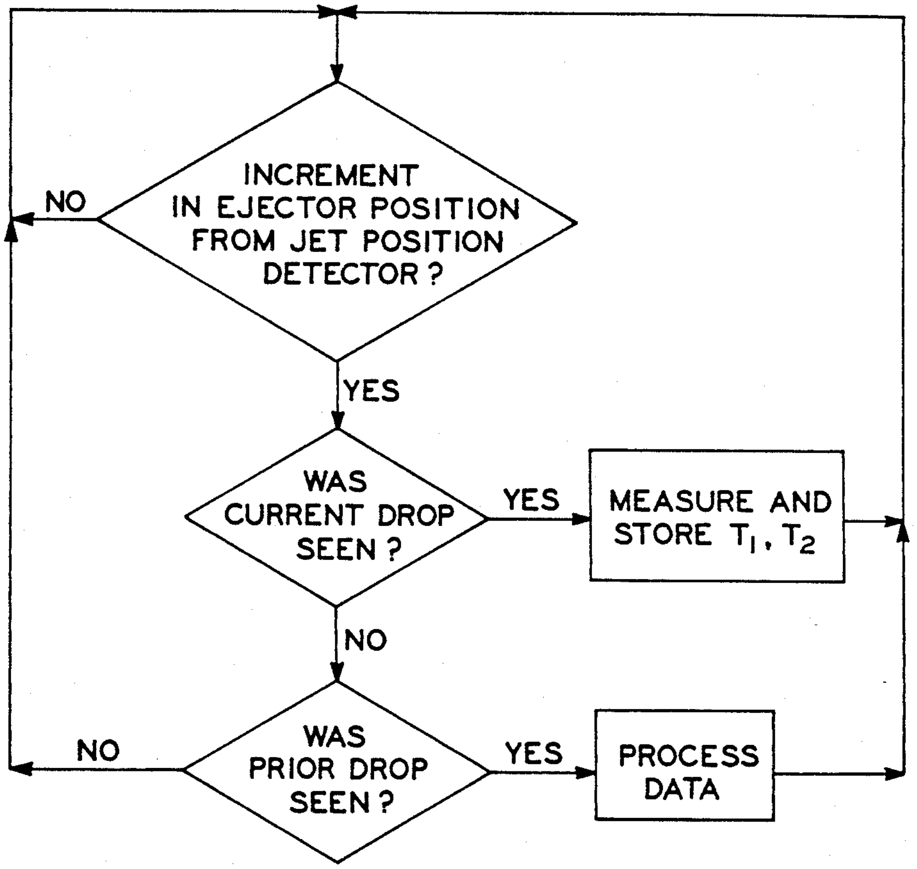
FIG. 5 is a simplified flowchart of the process used in the operation of the calibration system of the present invention.

FIG. 5 is a simplified flowchart of the process used in the operation of the apparatus of FIG. 1. As the ejector moves past the detection zone 13, droplets 31 are ejected at preset intervals. The program waits for a pulse in signal 25. If a pulse is detected, $T_1$ and $T_2$ are stored. If no pulse is detected, but a prior droplet was detected, the prior droplet becomes the last of the series, and the program branches to the curve fitting portion of the program to produce an error determination and, if required, a calibration correction.

In certain instances, it is possible that simply changing the time of droplet ejection will not provide the desired ejector operation. It would then be preferable to also be able to change droplet velocity by changing the amount of energy in jet drive pulse 15. This is especially desirable where it is desired to balance the operation of a number of ejectors in an array of ejectors. Since, as shown above, the velocity of the droplets can be readily calcuated, this information can be used by the ejector controller 17 to increase or decrease the amplitude and/or width of the drive pulse 15. Drive pulse 15 "tailoring" requires a more complicated system. However, a system for controlling drive pulse 15 amplitude and ejection delay, which can be used in the present invention, is disclosed in copending application Ser. No. 403,261, now U.S. Pat. No. 4,459,599, issued July 10, 1984, to Donald L. Ort and entitled "Drive Circuit for a Drop-on-Demand Ink Jet Printer", the disclosure of which is incorporated herein by reference.

For simplicity of analysis, the ejector 1 is scanned by the detection zone 13 at a calibration velocity ($V_c$) less than the print velocity ($V_p$). Also, the ejector 1 is fired during calibration at a rate such that only a single droplet is in flight between the ejector 1 and the droplet detection zone 13 at a time. This is easiest to keep track of data since you can fire the jet and detect the resultant droplet 31 before the next droplet 31 is ejected.

To correct for errors in horizontal droplet position, the calculation is as follows:

$$X_P = X_c + TOF(V_c - V_p)$$

$X_p$ is the desired correction
$X_c$ is the calibration determined placement error
TOF is the time of flight which is $T_1 + I_2/2$
$V_c$ is the velocity of the ejector 1 during calibration
$V_p$ is the velocity of the ejector during printing The $X_p$ is the correction in horizontal droplet placement which must be corrected for by delaying or advancing the time of droplet ejection. In this formula, care must be taken to use the correct mathematical signs, dependent upon the direction of the motion.

Other objects and features of this invention will be apparent to those skilled in the art from a reading of the specification and from the drawing. Such modifications are intended to be included within the scope of the present invention.

What is claimed is:

1. A method for calibrating a scanning carriage drop-on-demand ink jet ejector which comprises:

(a) providing a droplet detection zone, including a droplet detector, for generating a droplet detector output signal in response to droplet traverse through said detection zone;

(b) providing an ejector position detector for generating an ejector position output signal in response to ejector position;

(c) moving said ejector past said detection zone while ejecting droplets from said ejector toward said detection zone;

(d) analyzing said droplet detector output signal and said ejector position output signal to determine whether an error exists in ejector position; and (e) correcting the error by changing the time of droplet ejection during ejector printing.

2. The method for calibrating a drop-on-demand scanning carriage drop-on-demand ink jet ejector which comprises:

(a) providing a droplet detection zone, including a droplet detector, for generating a droplet detector output signal in response to droplet traverse through said detection zone;

(b) moving said ejector past said detection zone while ejecting droplets at predetermined times from said ejector toward said detection zone;

(c) analyzing said droplet detector output signal and said droplet predetermined ejection time to determine whether droplet time of flight varies from a predetermined value; and (d) adjusting the time at which droplets are ejected during ejector printing to compensate for any such variation in time of flight.

* * * * *